(12) United States Patent
Satori et al.

(10) Patent No.: US 7,154,680 B2
(45) Date of Patent: Dec. 26, 2006

(54) ZOOM LENS AND ELECTRONIC IMAGING SYSTEM USING THE SAME

(75) Inventors: Tomoyuki Satori, Kawagoe (JP); Masahiro Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/235,170

(22) Filed: Sep. 27, 2005

(65) Prior Publication Data
US 2006/0066955 A1    Mar. 30, 2006

(30) Foreign Application Priority Data
Sep. 29, 2004 (JP) .............................. 2004-284081

(51) Int. Cl.
*G02B 15/14* (2006.01)
(52) U.S. Cl. ....................... 359/687; 359/679
(58) Field of Classification Search ........ 359/676–687, 359/689, 690, 754, 761, 770, 771
See application file for complete search history.

(56) References Cited

U.S. PATENT DOCUMENTS

| | | | |
|---|---|---|---|
| 4,246,148 A | 1/1981 | Shimp et al. | 523/420 |
| 6,104,432 A * | 8/2000 | Nakamura et al. | 348/360 |
| 6,333,823 B1 | 12/2001 | Ozaki et al. | 359/690 |
| 6,754,446 B1 * | 6/2004 | Hagimori et al. | 396/72 |
| 2004/0233302 A1 * | 11/2004 | Kojima | 348/240.3 |

FOREIGN PATENT DOCUMENTS

JP    2004-037967    2/2004

* cited by examiner

*Primary Examiner*—Ricky Mack
*Assistant Examiner*—Mohammed Hasan
(74) *Attorney, Agent, or Firm*—Kenyon & Kenyon LLP

(57) ABSTRACT

The invention relates to an expensive zoom lens that has a zoom ratio of as high as about 5 and high optical performance and is very thin in its depth direction. With the invention, the optical path of the optical system is easily bendable by means of a reflecting optical member. The zoom lens includes a first lens group G1 having positive power, a second lens group G2 having negative power, a third lens group G3 having positive power and a fourth lens group G4 having positive power, and comprises five lens groups in all. The first lens group G1 comprises, in order from its object side, a lens component of negative refracting power, an optical path-bending reflecting optical member P and a lens component of positive refracting power. Upon zooming from the wide-angle end to the telephoto end, the first lens group remains substantially fixed with respect to an image plane I, the second lens group G2 moves only toward the image side, and the fourth lens group G4 moves in such a way as to be positioned nearer to the object side at the telephoto end than at the wide-angle end.

10 Claims, 10 Drawing Sheets

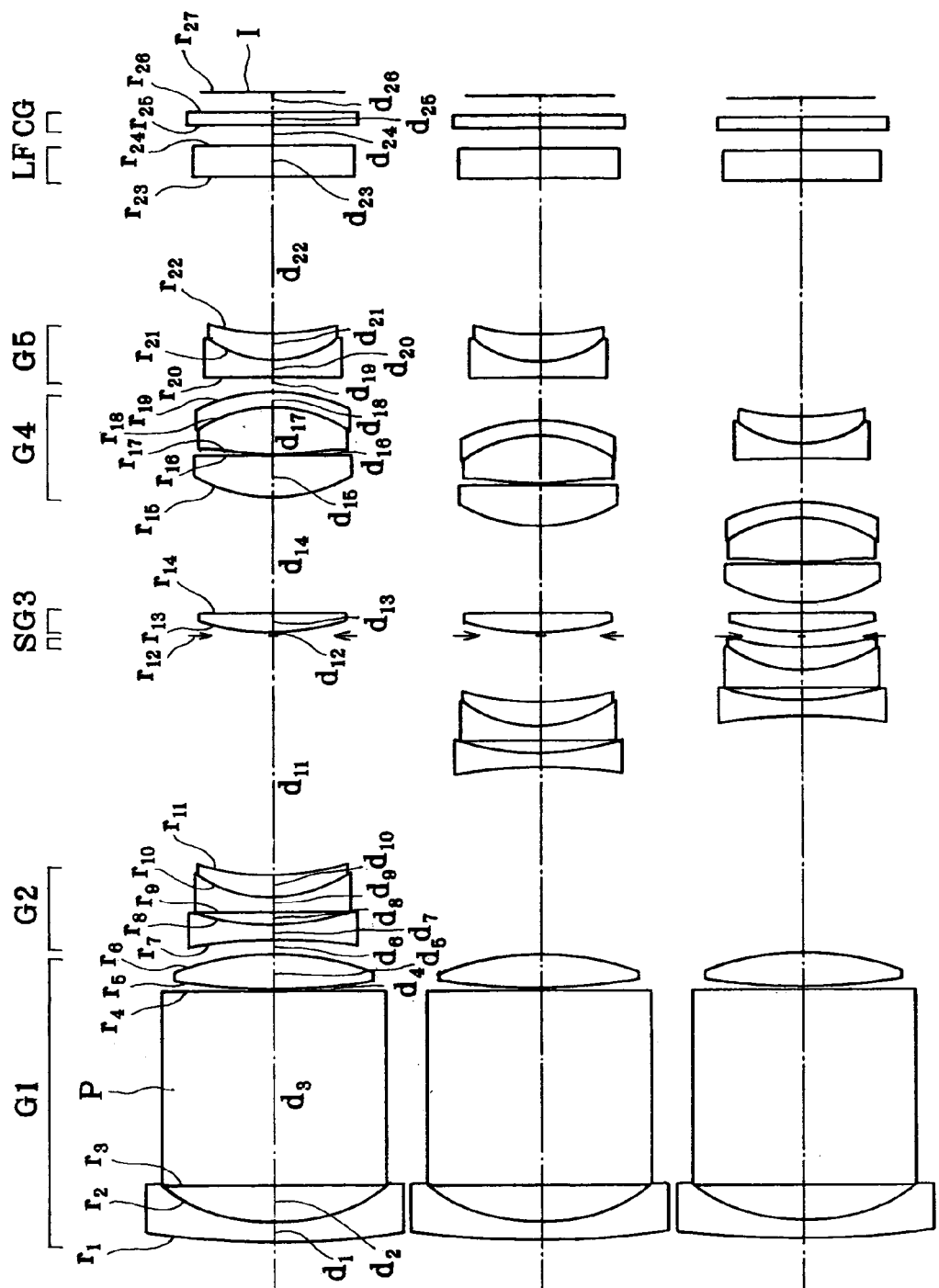

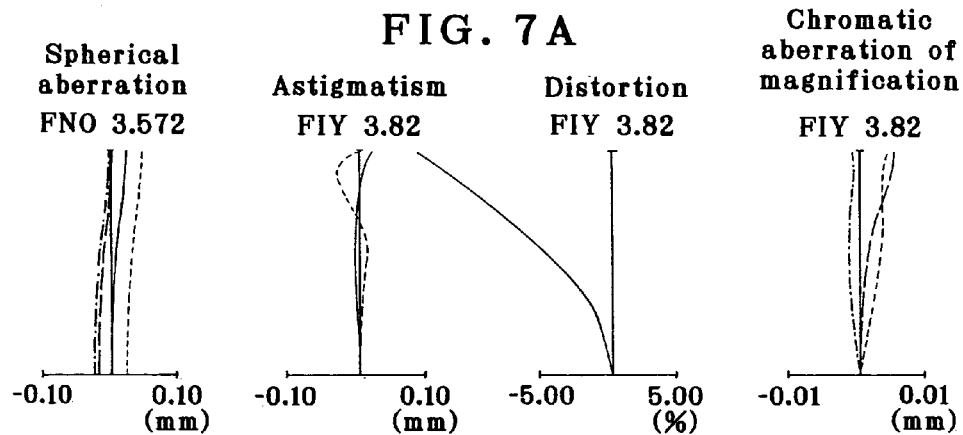
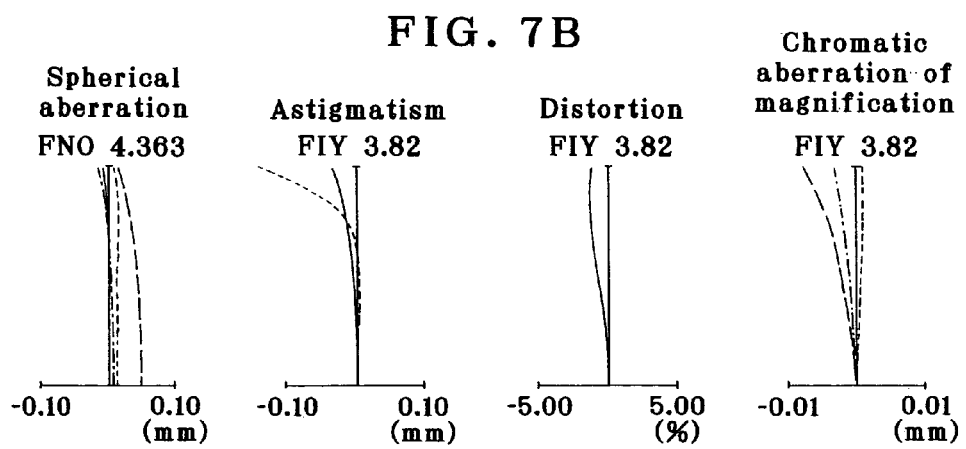
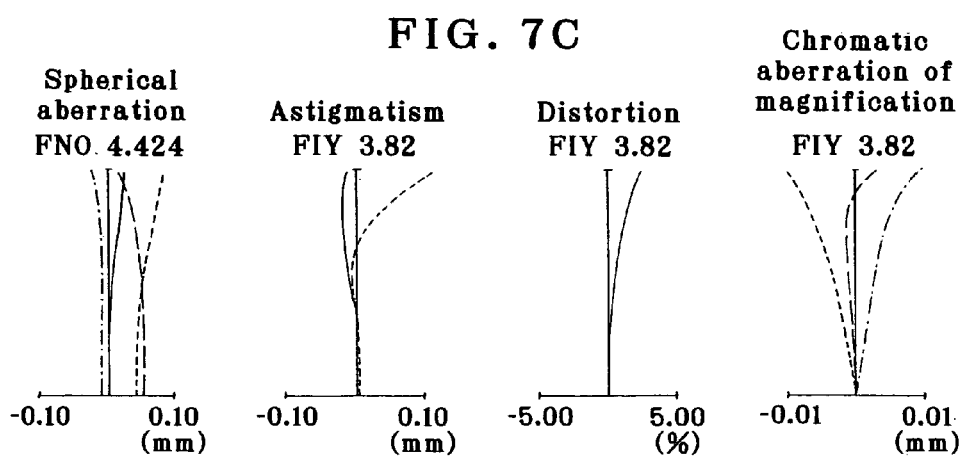

ZOOM LENS AND ELECTRONIC IMAGING SYSTEM USING THE SAME

This application claims benefits of Japanese Application No. 2004-284081 filed in Japan on Sep. 29, 2004, the contents of which are incorporated herein by this reference.

BACKGROUND OF THE INVENTION

The present invention relates generally to a zoom lens and an electronic imaging system using the same, and more particularly to a less costly electronic imaging system inclusive of video or digital cameras, the depth dimension of which is diminished by providing some contrivance to an optical system portion such as a zoom lens, and which ensures zoom ratios high enough to cover a wide focal length range from a wide-angle end to a telephoto end.

In recent years, digital cameras (electronic cameras) have received attention as the coming generation of cameras, an alternative to silver-halide 35 mm-film (135 format) cameras. Currently available digital cameras are broken down into some categories in a wide range from the high-end type for commercial use to the portable low-end type. In view of the category of the portable low-end type in particular, the primary object of the present invention is to provide the technology for implementing easy-to-use, high-zoom-ratio, less costly video or digital cameras whose depth dimension is reduced while high image quality is ensured, and which have zoom ratios high enough to cover a wide focal length range from a wide-angle end to a telephoto end.

The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for taking and received therein for carrying now becomes mainstream.

However, the use of the collapsible lens mount is not preferable in view of ease of operation, because much time is taken for sending the zoom lens received at it ready for use. Making the lens group nearest to the object side movable is again not preferable for prevention of entrance of moisture and dust.

More recent years have seen a camera version that takes no waiting time for sending it ready for use (for getting a zoom lens up and running), works favorably for prevention of entrance of moisture and dust and is much more slimmed down in its depth direction by use of an optical system with an optical path bent by a reflecting optical member such as a mirror or a prism. In a typical camera of this type, the lens group nearest to the object side of the zoom lens is fixed in terms of position and the reflecting optical member is received in that lens group, so that the subsequent optical path is bent longitudinally or transversely with respect to a camera body, thereby reducing the depth dimension as much as possible.

For the time being, many video or digital cameras under the portable category to which the invention is directed would have a zoom ratio of about 3; however, cameras having a zoom ratio of as high as about 5 will come out anyway.

For instance, Patent Publication 1 discloses a zoom lens relying on a bent optical system with a zoom ratio of about 5. However, this zoom lens, albeit having a zoom ratio of as high as about 5, has some demerits of using a bit more lenses and being costly, because of a complicated lens arrangement comprising six lens groups.

Patent Publication 1
JP(A)2004-37967

SUMMARY OF THE INVENTION

In consideration of such problems as briefed above, the primary object of the invention is to provide a zoom lens that is easy to ensure higher zoom ratios, has more improved optical performance, and is much more slimmed down in its depth direction, and an electronic imaging system incorporating it.

According to the invention, this object is accomplished by the provision of a zoom lens comprising five lens groups in all, and including, in order from its object side, a first lens group having positive power, a second lens group having negative power, a third lens group having positive power and a fourth lens group having positive power, characterized in that:

said first lens group comprises, in order from its object side, a negative lens component, an optical path-bending reflecting optical member and a positive lens component, and upon zooming from the wide-angle end to the telephoto end of the zoom lens, said first lens group remains substantially fixed with respect to an image plane, said second lens group moves only toward the image side of the zoom lens, and said fourth lens group moves in such a way as to be positioned nearer to the object side at the telephoto end than at the wide-angle end.

The invention also provides an electronic imaging system, comprising a zoom lens as recited in claim 1 and an electronic image pickup device for producing an image formed through said zoom lens as image data, wherein a shape of the image data is capable of being changed by processing the image data, and said zoom lens satisfies the following condition (5) upon focusing on a substantially infinite object point:

$$0.75 < y_{07}/(f_w \cdot \tan \omega_{07w}) < 0.97 \qquad (5)$$

where $y_{10}$ is a distance (maximum image height) from a center to the farthest point in an effective image pickup plane of the electronic image device, $y_{07}$ is represented as $y_{07}=0.7y_{10}$, and $\omega_{07w}$ is an angle with an optical axis in a direction of an object point corresponding to an image point formed at a position of $y_{07}$ from the center on the effective image pickup plane of the electronic image pickup device at the wide-angle end.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIGS. 1(A), 1(B) and 1(C) are illustrative in lens arrangement section of Example 1 of the zoom lens of the invention at the wide-angle end, in an intermediate setting and at the telephoto end, respectively, upon focusing on an object point at infinity.

FIGS. 7(A), 7(B) and 7(C) are aberration diagrams, as in FIGS. 5(A), 5(B) and 5(C), but of Example 3.

DESCRIPTION OF THE PREFERRED EMBODIMENTS

Figures 2A, 2B, 2C:
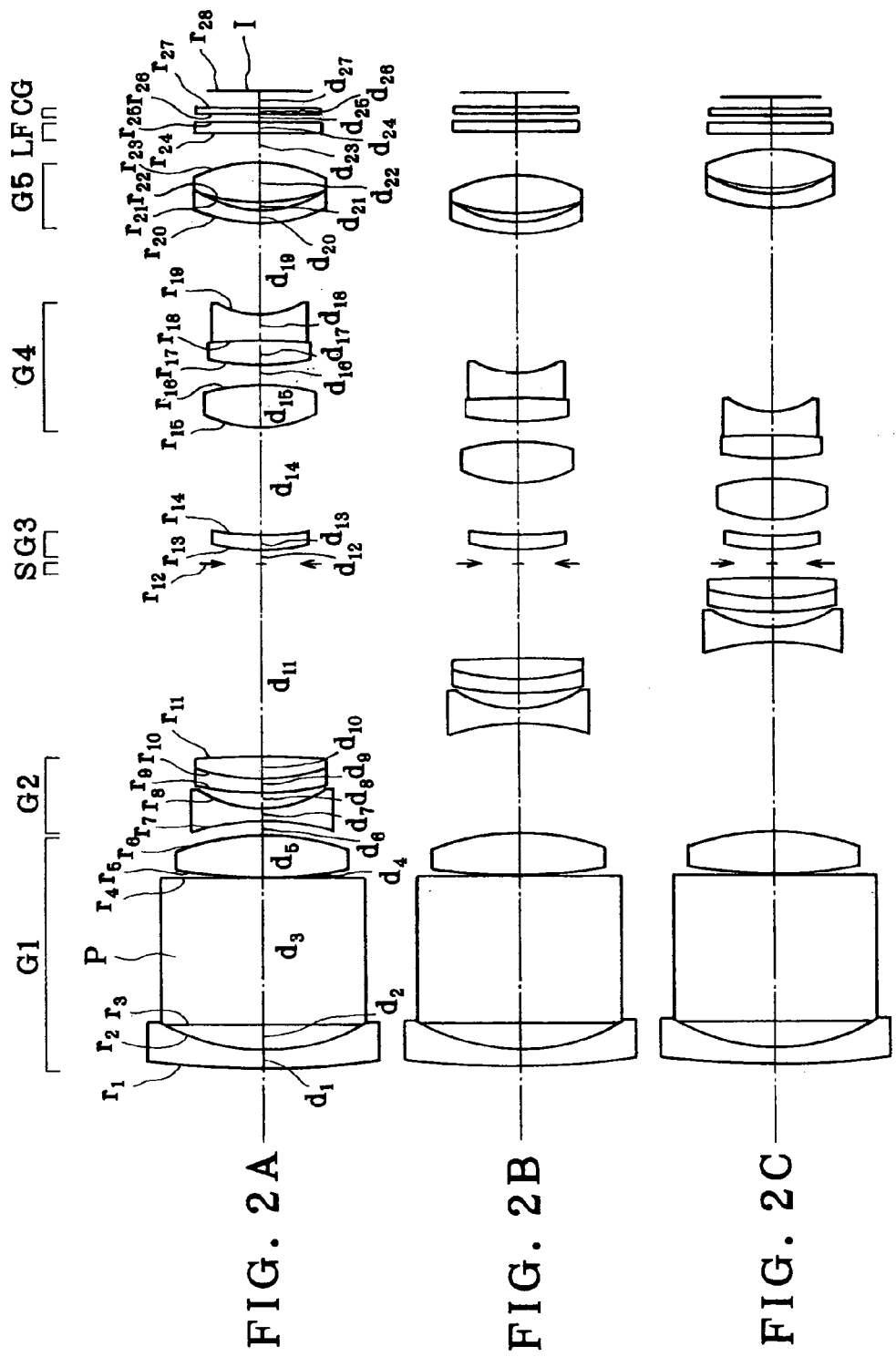
FIGS. 2(A), 2(B) and 2(C) are lens arrangement sections, as in FIGS. 1(A), 1(B) and 1(C), but of the zoom lens of Example 2.

The advantage of, and the requirement for, the arrangement as recited above is now explained.

Such construction enables an optical path to be bent in the first lens group to diminish the depth dimension of the zoom lens for slimming-down purposes, and allows the second lens group to move only toward the image plane side of the zoom lens and the fourth lens group to move in such a way as to be positioned nearer to the object side of the zoom lens at the telephoto end than at the wide-angle end of the zoom lens, so that there can be a zooming load sharing between the second lens group and the fourth lens group, thereby achieving a high-zoom-ratio arrangement. Further, the first lens group remains substantially fixed with respect to an image plane during zooming so that the camera can be instantaneously sent ready for use (with no waiting time for booting the zoom lens upp), and is preferably well protected against entrance of moisture and dust.

For a zoom lens like one contemplated herein, it is preferable that the second lens group satisfies the following condition (1) with respect to power, thereby achieving size reductions while an efficient zooming function is kept.

$$0.8<|f_2/f_w|<4.0 \tag{1}$$

Here, $f_2$ is the focal length of the second lens group, and $f_w$ is the focal length of the zoom lens at the wide-angle end.

As the upper limit of 4.0 to this condition is exceeded, it causes the power of the second lens group to become too weak, resulting in an increase in the amount of its movement for zooming. As the lower limit of 0.8 is not reached, it causes the paraxial image-formation magnification of the second lens group to become low, again resulting in an increase in the amount of its movement for zooming, and renders correction of aberrations difficult as well.

More preferably, $$0.9<|f_2/f_w|<3.5 \tag{1'}$$

Most preferably, $$1.0<|f_2/f_w|<3.0 \tag{1''}$$

For the same reason as in the second lens group, it is also preferable for the fourth lens group to satisfy the following condition (2).

$$0.8<|f_4/f_w|<4.0 \tag{2}$$

Here, $f_4$ is the focal length of the fourth lens group.

More preferably, $$0.9<|f_4/f_w|<3.5 \tag{2'}$$

Most preferably, $$1.0<|f_4/f_w|<3.0 \tag{2''}$$

To achieve size reductions that are the object of the invention by meeting a physical requirement for bending the optical path, diminishing the size and thickness of an optical path-bending reflecting optical member and avoiding an increase in the diameter and size of each of the optical elements that form the first lens group, it is important that the entrance pupil position be as shallow with respect to the entrance surface as possible. For this purpose, it is necessary to make the powers of a negative component and a positive component in the first lens group as strong as possible. It is then preferred to satisfy the following conditions (3) and (4).

$$0.8<|f_{1n}/\sqrt{(f_w \times f_t)}|<3.0 \tag{3}$$

$$0.8<f_{1p}/\sqrt{(f_w \times f_t)}<3.0 \tag{4}$$

Here $f_{1n}$ is the focal length of the negative lens component in the first lens group, $f_{1p}$ is the focal length of the positive lens component in the first lens group, $f_w$ is the focal length of the zoom lens at the wide-angle end, and $f_t$ is the focal length of the zoom lens at the telephoto end.

As the upper limits of 3.0 to both conditions (3) and (4) are exceeded, it causes the entrance pupil position to remain deep and the diameter and size of each of the optical elements that form the first lens group to increase, rendering it difficult to meet the physical requirement for bending the optical path. As the lower limit of 0.8 to each condition, it causes the powers of the negative and positive components in the first lens group to become too strong, resulting in an increased sensitivity of both to performance degradation due to their relative decentration. It also renders off-axis aberrations likely to occur to such an extent that they are hardly corrected.

It is more preferable to satisfy at least one of the following conditions (3') and (4').

$$0.9<|f_{1n}/\sqrt{(f_w \times f_t)}|<2.5 \tag{3'}$$

$$0.9<f_{1p}/\sqrt{(f_w \times f_t)}<2.5 \tag{4'}$$

It is most preferable to satisfy at least one of the following conditions (3") and (4").

$$1.0<|f_{1n}/\sqrt{(f_w \times f_t)}|<2.0 \tag{3''}$$

$$1.0<f_{1p}/\sqrt{(f_w \times f_t)}<2.0 \tag{4''}$$

In view of size reductions, it is desired that the negative and positive lens components in the first lens group be each composed of a single lens.

The zoom lens of the invention is susceptible of distortion, because the negative lens of stronger power is located at the entrance surface. If distortion is acceptable, however, it is then possible to diminish the optical path-bending reflecting optical member in the first lens group, because of a decrease in the height of incidence light rays relative to the angle of view. In the invention, therefore, barrel distortion is produced so intentionally that image distortion by the distortion produced at the optical system is corrected using a function of processing and shaping image data obtained by taking an image formed through that zoom lens with an electronic image pickup device. In particular, it is ideal to produce an image from an electronic imaging device such as a camera in the form of already corrected image data. In this conjunction, the optical system should preferably satisfy the following condition (5) with respect to the distortion of that zoom lens upon focusing on a substantially infinite object point.

$$0.75 < y_{07}/(f_w \cdot \tan \omega_{07w}) < 0.97 \qquad (5)$$

where $y_{10}$ is a distance (maximum image height) from a center to the farthest point in an effective image pickup plane of the electronic image device, $y_{07}$ is represented as $y_{07} = 0.7 y_{10}$, and $\omega_{07w}$ is an angle with an optical axis in a direction of an object point corresponding to an image point formed at a position of $y_{07}$ from the center on the effective image pickup plane of the electronic image pickup device at the wide-angle end.

Condition (5) having a value of about 1 exceeding the upper limit of 0.97 means that distortion is optically well corrected. However, this also means that it is difficult to capture images over a wide angle-of-view range while the optical system is kept small. As the lower limit of 0.75 is not reached, it causes a noticeable deterioration in the sharpness of the peripheral portion of an image when image distortion by reason of the distortion of the optical system is corrected by image processing, because of too high an enlarging magnification of the peripheral portion of the image in the radial direction.

More preferably, $$0.80 < y_{07}/(f_w \cdot \tan \omega_{07w}) < 0.96 \qquad (5')$$

Most preferably, $$0.85 < y_{07}/(f_w \cdot \tan \omega_{07w}) < 0.95 \qquad (5'')$$

The first lens group is now explained at great length.

As previously noted, it is important to make the entrance pupil position shallow for the purpose of the invention. It is then important to reduce the number of optical elements as far as an aperture stop as much as possible. The location of more lenses on the object side with respect to the optical path-bending optical member in the first lens group means that when the optical path is bent, the thickness of the first lens group in the depth direction does not become small. In the examples of the invention given later, therefore, the negative lens component, and the positive lens component in the first lens group is composed of a single lens.

For correction of aberrations produced within the first lens group, it is preferable to apply a concave surface to the image-side surface of the negative lens located in the first lens group and nearest to its object side and locate an aspheric surface thereat. This is particularly effective for correction of astigmatism. Also, because the curvature of that surface can be weakened, performance deterioration due to fabrication errors is much more limited, making a contribution to thickness reductions in the depth direction.

The use of a prism for the optical path-bending optical member is most favorable for thickness reductions in the depth direction. The d-line refractive index of the prism medium is preferably high, more preferably at least 1.70, and even more preferable at lest 1.80.

The first lens group should preferably satisfy the following condition (6) with respect to power.

$$1.5 < f_1/f_1 < 5.0 \qquad (6)$$

Here $f_1$ is the focal length of the first lens group, and $f_w$ is the focal length of the zoom lens at the wide-angle end.

Exceeding the upper limit of 5.0 to condition (6) renders correction of off-axis aberrations and chromatic aberrations difficult. Falling short of the lower limit of 1.5 causes the paraxial magnification of the second lens group to become low and the zooming ratio to tend to become low relative to the amount of its movement.

More preferably, $$2.0 < f_1/f_w < 4.5 \qquad (6')$$

Most preferably, $$2.5 < f_1/f_w < 4.0 \qquad (6'')$$

The second lens group is now explained in more details.

For the second lens group, too, the number of parts as far as the aperture strop should preferably be minimized so as to make the entrance pupil position shallow, as is the case with the first lens group. In order for the second lens group to have negative refracting power while the number of parts as far as the aperture stop is minimized, it is made up of two negative lenses and one positive lens, three in all, in the examples given later. The second lens group, because of taking on zooming, has large negative power, and two negative lenses are located for power dispersion. To ensure that negative power with a minimum of lenses, a double-concave lens is used as the negative lens located in the second lens group and nearest to its object side. Further, the location of one positive lens helps prevent a Petzval's sum from becoming worse and works for correction of off-axis various aberrations. If any of the negative lenses is cemented to the positive lens into a doublet, it then works for correction of chromatic aberrations. If a vitreous material having an Abbe constant of at least 70 is used for the positive lens to be cemented, it works well for correction of chromatic aberrations. An Abbe constant of 80 or greater is desired.

As mentioned above, the second lens group, because of taking on zooming, has strong power and so is susceptible of large aberration fluctuations with zooming. To keep satisfactory performance all over the zoom range, therefore, it is required to remove aberrations within the second lens group. Preferably to this end, an aspheric surface is applied to the image-side concave surface of the negative lens located in the second lens group and nearest to its object side. This is particularly effective of correction of astigmatism.

The third lens group is now explained at great length.

The third lens group is allowed to have positive power. This helps lower the height of light rays at the subsequent lens groups, so that even when its thickness in the depth direction is reduced upon bending of the optical path, there is no or little shading of rim light beams with the result that decreases in the quantity of light at the periphery of the screen are minimized. One positive lens suffices for this lens group, because its main function is to lower the height of light rays at the subsequent groups. Of course, two or more lenses could be used for enhanced correction of aberrations; however, this costs much and works against space savings. When the second lens group is made up of a single lens, it should preferably be in a meniscus form convex on its object side. Such a form permits the principal points to come so close to the object side that it is easy to increase the paraxial image-formation magnification at the third lens group and the subsequent groups.

Substantial fixation of the third lens group with respect to the image plane during zooming works for space and cost savings, because the number of parts such as an actuator for driving the lenses can be diminished, although the third lens group could be designed to move in unison with the stop, as will be described later.

The fourth lens group is now explained in more details.

In the invention, the fourth lens group is allowed to have a zooming function by designing it to be positioned nearer to the object side at the telephoto end than at the wide-angle end. With a bent optical system such as one contemplated herein, however, an image point formed by a combined system of the first and second lens groups, i.e., an object point with respect to a combined system of the third lens group and the subsequent groups is likely to come close to the subject side. This in turn causes the magnification of a combined system of the third and the subsequent groups to tend to become low, rendering it more difficult to obtain high magnifications relative to the movement of the fourth lens group. In the examples of the invention given later, therefore, the internal arrangement of the fourth lens group has ++-construction, in order from its object side, such that the power of the fourth lens group becomes as strong as possible and the principal points are positioned as close to the object side as possible. In view of correction of aberrations, the positive lens and one negative lens should preferably be cemented together into a doublet. This is effective for correction of axial and off-axis chromatic aberrations. If at least one aspheric surface is applied to any of the lens surfaces, it works for correction of spherical aberrations and coma.

The fifth lens group is now explained in more details.

The fifth lens group has a role of making the angle of light rays incident on the electronic image pickup device proper. This lens group could have either positive or negative power. As the fifth lens group has negative power, it can lower the height of light ray throughout the zoom lens system, so that even when its depth-direction thickness is diminished upon bending of the optical path, there is no or little shading of rim light beams with the result that a sufficient quantity of light can be ensured at the peripheral portion of the screen. In the examples of the invention given later, the fifth lens group is movable so as to increase the degree flexibility in correction of aberrations. In consideration of the role of making the angle of light rays incident on the electronic image pickup device proper, however, the fifth lens group could be fixed with respect to the image plane during zooming.

The fifth lens group should preferably satisfy the following conditions (7) and (8) with respect to power.

$$0.6 < |f_5/f_w| < 20 \quad (7)$$

$$0.1 < |f_5/f_t| < 5.0 \quad (8)$$

Here $f_5$ is the focal length of the fifth lens group, $f_w$ is the focal length of the zoom lens at the wide-angle end, and $f_t$ is the focal length of the zoom lens at the telephoto end.

The fifth lens group could be used as a focusing group. As the upper limits of 20 and 5.0 to conditions (7) and (8), respectively, are exceeded, it causes an increase in the amount of movement of the fifth lens group that acts as the focusing group upon focusing from infinity to a nearby object point; it works against compactness. As the lower limits of 0.6 and 0.1, respectively, are not reached, it causes an increase in the angle of incidence of off-axis light rays on the electronic image pickup device, which otherwise results in shading of brightness at the peripheral portion of the screen that is peculiar to a CCD or other electronic image pickup device.

More preferably, at least one of the following conditions (7') and (8') should be satisfied.

$$0.8 < |f_5/f_w| < 15.0 \quad (7')$$

$$0.15 < |f_5/f_t| < 4.0 \quad (8')$$

Most preferably, at least one of the following conditions (7") and (8") should be satisfied.

$$1.0 < |f_5/f_w| < 10.0 \quad (7'')$$

$$0.2 < |f_5/f_t| < 3.0 \quad (8'')$$

Reference is now made to the aperture stop.

The aperture stop should preferably be positioned just before or just after the third lens group. At such a site, the diameter of the aperture is less likely to increase even at a decreased F-number and the height of light rays becomes relatively low, because the first lens group is a group of positive power; the space for receiving a shutter actuator, a stop blade or the like is easily secured. In the examples of the invention given later, the aperture stop is located just in front of the third lens group, although it could be located just in the rear of the third lens group.

The aperture stop could be either fixed in terms of position or movable with the moving group as one integral piece. In Examples 1 and 2 of the invention described later, the aperture stop remains substantially fixed with respect to the image plane. This dispenses with any space through which the stop, the shutter actuator, etc. move, making dead space less likely to occur in a lens barrel unit and making it easy to ensure the space for the location of other members such as a lens driving actuator. In Examples 3 and 4, the stop is designed to move in unison with the third lens group and is positioned nearer to the object side at the wide-angle end than at the telephoto end. Accordingly, the stop is moved to the object side at the wide-angle end, so that the entrance pupil position can be kept shallow. This in turn permits the height of light rays in the first lens group to be kept so low that the bending of the optical path can be facilitated with effective prevention of an increase in the diameter of the front lens.

Reference is now made to focusing.

With the object of the invention in mind, it is preferable to keep the first lens group fixed, and with the construction of the invention, the paraxial image-formation magnification of the second lens group is likely to become an erratic -1. Thus, focusing should preferably be carried out by a part or all of the third, fourth and fifth lens groups. Focusing could also be performed by any one of the third, fourth and fifth lens groups. However, the use of the groups that move for zooming as the focusing group is favorable in consideration of space and cost requirements, because the actuator for driving the zooming lens groups can also be used for the driving of focusing or it is unnecessary to provide a separate actuator for the driving of focusing.

By the way, the zoom lens of the invention should preferably satisfy the following condition (9).

$$3.5 < f_t/f_w < 10 \quad (9)$$

Here $f_w$ is the focal length of the zoom lens at the wide-angle end, and $f_t$ is the focal length of the zoom lens at the telephoto end.

As the upper limit of 10 to condition (9) is exceeded, it renders it impossible to set up any compact imaging system, because an increased zoom ratio causes the amount of movement of the lens groups that move for zooming to become too large, resulting in size increases in the direction of bending the optical path. As the lower limit of 3.5 is not reached, the object of the invention is achievable even with an arrangement of simpler construction than in the invention.

More preferably, $$4.0 < f_t/f_w < 9.0 \quad (9')$$

Most preferably, $$4.5 < f_t/f_w < 8.0 \quad (9'')$$

As can be seen from the explanations given above, the present invention can successfully provide a zoom lens that can instantaneously send a camera ready for use (without any waiting time for booting up the zoom lens) as is not the case with a collapsible lens mount camera, and is preferable for prevention of entrance of moisture and dust. With the arrangement of the invention, the optical path (optical axis) of the optical system can be easily bent by means of a reflecting optical member such as a prism so that a camera, when the zoom lens of the invention is applied to it, can be much more reduced in terms of depth-direction thickness. Further, that zoom lens can have a zoom ratio of as high as about 5 and improved optical performance, and can be very thin in the depth direction, and costs less.

The zoom lens of the invention is now explained with reference to Examples 1, 2, 3 and 4. Lens arrangement sections of Examples 1, 2, 3 and 4 at the wide-angle end, in an intermediate setting and at the telephoto end, respectively, upon focusing on an infinite object point are presented in FIGS. 1A, 1B and 1C, FIGS. 2A, 2B and 3C, FIGS. 3A, 3B and 3C, and FIGS. 4A, 4B and 4C, respectively. Throughout FIGS. 1 to 4, G1 stands for the first lens group, G2 the second lens group, S the stop, G3 the third lens group, G4 the fourth lens group, G4 the fourth lens group, G5 the fifth lens group, LF the optical low-pass filter, CG the cover glass for a CCD that is an electronic image pickup device, and I the image plane of CCD. P indicates the optical path-bending prism in the first lens group G1 with taken-apart optical paths. A near infrared sharp cut coating, for instance, could be applied directly onto the optical low-pass filter LF or another infrared cut absorption filter could be separately provided. Alternatively, a transparent flat plate with a near infrared sharp cut coating applied on its entrance surface could be used. The optical path-bending prism P could typically be provided in the form of a reflecting prism for bending the optical path 90°.

EXAMPLE 1

As shown in FIGS. 1A, 1B and 1C, this example is directed to a zoom lens made up of a first lens group G1 composed of a negative meniscus lens convex on its object side, an optical path-bending prism P and a double-convex positive lens, a second lens group G2 composed of a double-convex negative lens and a doublet consisting of a negative meniscus lens convex on its object side and a positive meniscus lens convex on its object side, an aperture stop S, a third lens group G3 composed of one positive meniscus lens convex on its object side, a fourth lens group G4 composed of a positive meniscus lens convex on its object side and a doublet consisting of a double-convex positive lens and a negative meniscus lens convex on its image plane side, and a fifth lens group G5 composed of a doublet consisting of a double-concave negative lens and a positive meniscus lens convex on its object side. Upon zooming from the wide-angle end to the telephoto end of the zoom lens, the first lens group G1 remains fixed, the second lens group G2 moves toward the image plane side of the zoom lens, the third lens group G3 and the aperture stop S remain fixed, the fourth lens group G4 moves toward the object side of the zoom lens, and the fifth lens group G5 hardly budges from the wide-angle end up to an intermediate setting, and moves toward the object side from the intermediate setting to the telephoto end while the space between the fourth lens group G4 and it is kept substantially constant.

Two aspheric surfaces are used: one at the image plane-side surface of the negative meniscus lens in the first lens group G1 and one at the surface of the doublet located in the fourth lens group G4 and nearest to its object side.

EXAMPLE 2

As shown in FIGS. 2A, 2B and 2C, this example is directed to a zoom lens made up of a first lens group G1 composed of a negative meniscus lens convex on its object side, an optical path-bending prism P and a double-convex positive lens, a second lens group G2 composed of a double-concave negative lens and a doublet consisting of a negative meniscus lens convex on its object side and a double-convex positive lens, an aperture stop S, a third lens group G3 composed of one positive meniscus lens convex on its object side, a fourth lens group G4 composed of a double-convex positive lens and a doublet consisting of a double-convex positive lens and a double-concave negative lens, and a fifth lens group G5 composed of a negative meniscus lens convex on its object side and a double-convex positive lens. Upon zooming from the wide-angle end to the telephoto end of the zoom lens, the first lens group G1 remains fixed, the second lens group G2 moves toward the image plane side of the zoom lens, the third lens group G3 remains fixed together with the aperture stop S, the fourth lens group G4 moves toward the object side of the zoom lens, and the firth lens group G5 moves in a concave locus toward the image plane side and is positioned nearer to the image plane side at the telephoto end than at the wide-angle end.

Four aspheric surfaces are used: one at the image plane-side surface of the negative meniscus lens in the first lens group G1, one at the image plane-side surface of the double-concave negative lens in the second lens group G2, and two at both surfaces of the single double-convex positive lens in the fourth lens group G4.

EXAMPLE 3

Figure 3A:
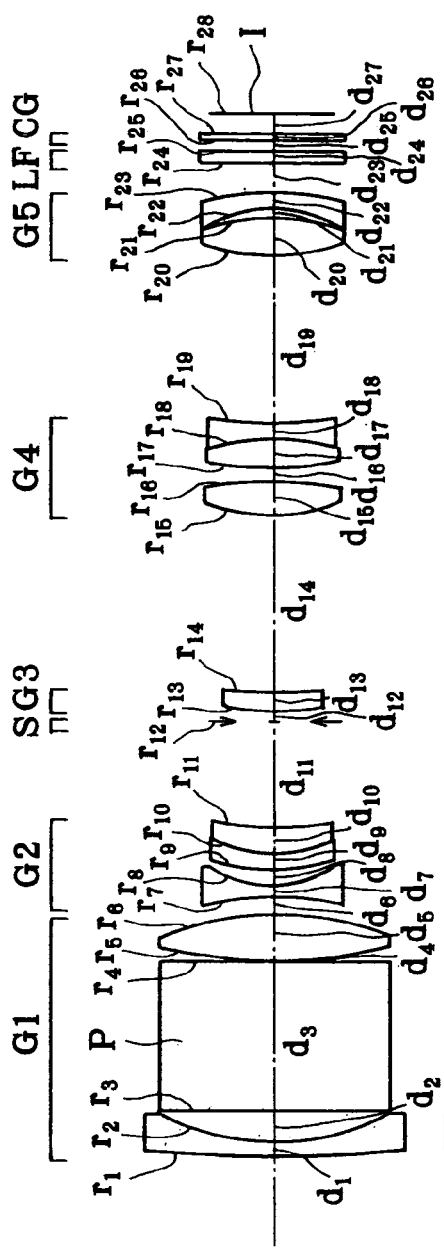
FIGS. 3(A), 3(B) and 3(C) are lens arrangement sections, as in FIGS. 1(A), 1(B) and 1(C), but of the zoom lens of Example 3.
Figure 3B:
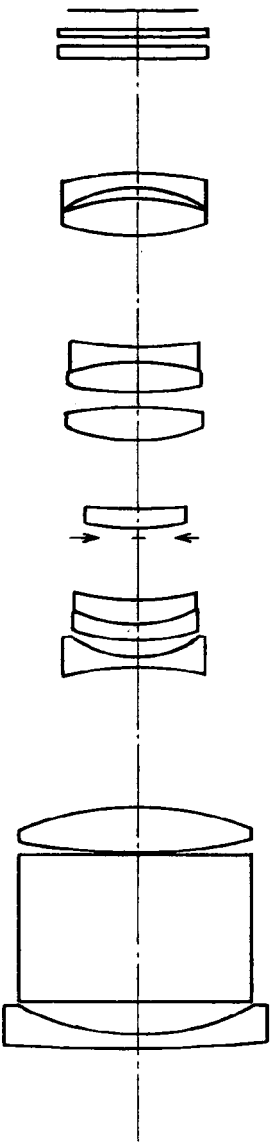
Figure 3C:
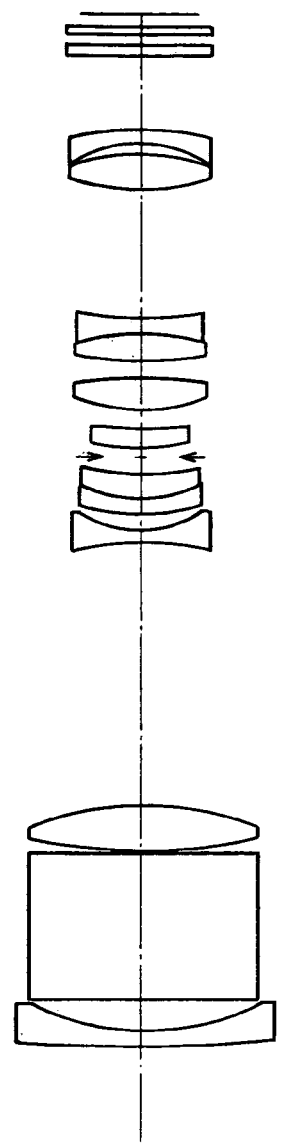

As shown in FIGS. 3A, 3B and 3C, this example is directed to a zoom lens made up of a first lens group G1 composed of a negative meniscus lens convex on its object side, an optical path-bending prism P and a double-convex positive lens, a second lens group G2 composed of a double-concave negative lens and a doublet consisting of a negative meniscus lens convex on its object side and a positive meniscus lens convex on its object side, an aperture stop S, a third lens group G3 composed of one positive meniscus lens convex on its object side, a fourth lens group G4 composed of a double-convex positive lens and a doublet consisting of a double-convex positive lens and a double-concave negative lens, and a fifth lens group G5 composed of a double-convex positive lens and a negative meniscus lens convex on its image plane side. Upon zooming from the wide-angle end to the telephoto end of the zoom lens, the first lens group G1 remains fixed, the second lens group G2 moves toward the image plane side of the zoom lens, the third lens group G3 moves together with the aperture stop S toward the image plane side with a narrowing space between the second lens group G2 and it, the fourth lens group G4 moves in a convex locus toward the object side and is positioned somewhat nearer to the object side at telephoto end than at the wide-angle end, and the fifth lens group G5 moves in a concave locus toward the image plane side and is positioned nearer to the object side at the telephoto end than at the wide-angle end.

Four aspheric surfaces are used: one at the image plane-side surface of the negative meniscus lens in the first lens group G1, one at the image plane-side surface of the double-concave negative lens in the second lens group G2, and two at both surfaces of the single double-convex positive lens in the fourth lens group G4.

EXAMPLE 4

Figure 4A:
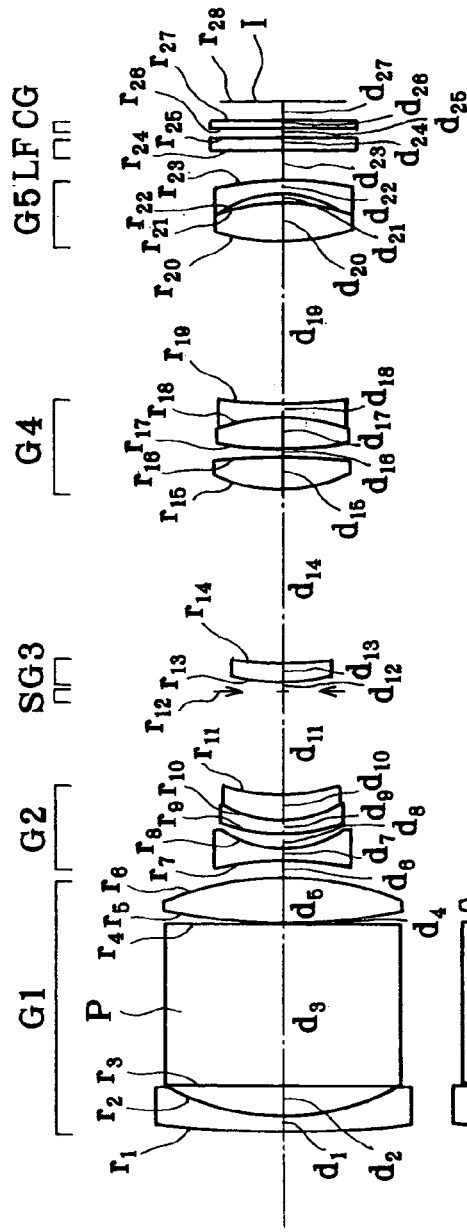
FIGS. 4(A), 4(B) and 4(C) are lens arrangement sections, as in FIGS. 1(A), 1(B) and 1(C), but of the zoom lens of Example 4.
Figure 4B:
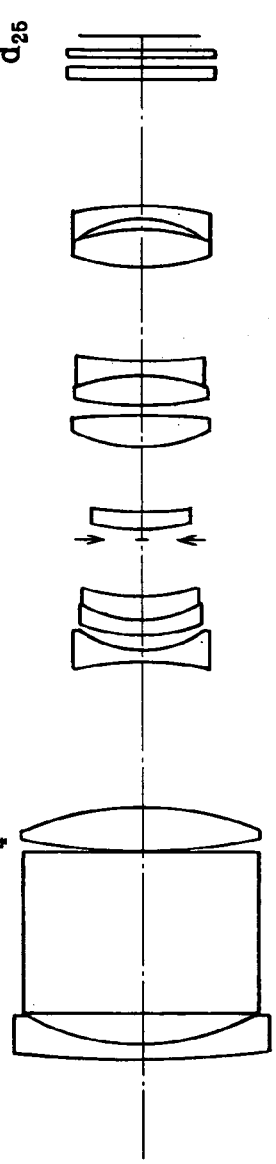
Figure 4C:
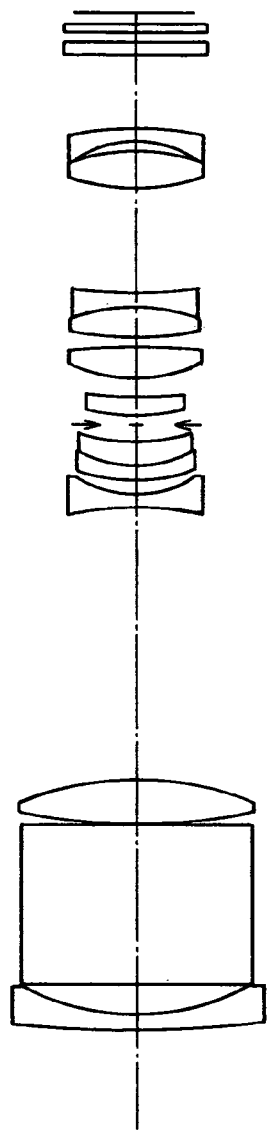

As shown in FIGS. 4A, 4B and 4C, this example is directed to a zoom lens made up of a first lens group G1 composed of a negative meniscus lens convex on its object side, an optical path-bending prism P and a double-convex positive lens, a second lens group G2 composed of a double-concave negative lens and a doublet consisting of a negative meniscus lens convex on its object side and a positive meniscus lens convex on its object side, an aperture stop S, a third lens group G3 composed of one positive meniscus lens convex on its object side, a fourth lens group G4 composed of a double-convex positive lens and a doublet consisting of a double-convex positive lens and a double-concave negative lens, and a fifth lens group G5 composed of a double-convex positive lens and a negative meniscus lens convex on its image plane side. Upon zooming from the wide-angle end to the telephoto end of the zoom lens, the first lens group G1 remains fixed, the second lens group G2 moves toward the image plane side of the zoom lens, the third lens group G3 moves together with the aperture stop S toward the image plane side with a narrowing space between the second lens group G2 and it, the fourth lens group G4 moves in a convex locus toward the object side and is positioned somewhat nearer to the image plane side at the telephoto end than at the wide-angle end, and the fifth lens group G5 moves in a concave locus toward the image plane side and is positioned nearer to the object side at the telephoto end than at the wide-angle end.

Four aspheric surfaces are used: one at the image plane-side surface of the negative meniscus lens in the first lens group G1, one at the image plane-side surface of the double-concave negative lens in the second lens group G2 and two at both surfaces of the single double-convex positive lens in the fourth lens group G4.

Numerical data about each of Examples 1 to 4 are enumerated below. The symbols used hereinafter but not hereinbefore have the following meanings.

f: focal length of the zoom lens,
$F_{NO}$: F-number,
WE: wide-angle end,
ST: intermediate setting,
TE: telephoto end,
$r_1, r_2 \ldots$ : radius of curvature of each lens surface,
$d_1, d_2 \ldots$ : space between adjacent lens surfaces,
$n_{d1}, n_{d2} \ldots$ : d-line refractive index of each lens, and
$\nu_{d1}, \nu_{d2} \ldots$ Abbe constant of each lens.

Here let x be an optical axis provided that the direction of propagation of light is positive and y be a direction orthogonal to the optical axis. Then, aspheric shape is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4, A_6, A_8$ and $A_{10}$ are the $4^{th}$-, $6^{th}$-, $8^{th}$-, and $10^{th}$-order aspheric coefficients, respectively.

EXAMPLE 1

| | | | |
|---|---|---|---|
| $r_1 = 54.570$ | $d_1 = 0.90$ | $n_{d1} = 1.84666$ | $\nu_{d1} = 23.78$ |
| $r_2 = 11.000$ (Aspheric) | $d_2 = 1.81$ | | |
| $r_3 = \infty$ | $d_3 = 10.00$ | $n_{d2} = 1.72916$ | $\nu_{d2} = 54.68$ |
| $r_4 = \infty$ | $d_4 = 0.10$ | | |
| $r_5 = 30.910$ | $d_5 = 1.72$ | $n_{d3} = 1.72916$ | $\nu_{d3} = 54.68$ |
| $r_6 = -14.405$ | $d_6 = $ (Variable) | | |
| $r_7 = -26.160$ | $d_7 = 0.80$ | $n_{d4} = 1.78800$ | $\nu_{d4} = 47.37$ |
| $r_8 = 14.011$ | $d_8 = 0.63$ | | |
| $r_9 = 457.967$ | $d_9 = 0.80$ | $n_{d5} = 1.78800$ | $\nu_{d5} = 47.37$ |
| $r_{10} = 6.650$ | $d_{10} = 1.24$ | $n_{d6} = 1.84666$ | $\nu_{d6} = 23.78$ |
| $r_{11} = 16.769$ | $d_{11} = $ (Variable) | | |
| $r_{12} = \infty$ (Stop) | $d_{12} = 0.20$ | | |
| $r_{13} = 12.661$ | $d_{13} = 1.05$ | $n_{d7} = 1.60342$ | $\nu_{d7} = 38.03$ |
| $r_{14} = 167.903$ | $d_{14} = $ (Variable) | | |
| $r_{15} = 7.883$ | $d_{15} = 2.10$ | $n_{d8} = 1.49700$ | $\nu_{d8} = 81.54$ |
| $r_{16} = 418.441$ | $d_{16} = 0.10$ | | |
| $r_{17} = 24.648$ (Aspheric) | $d_{17} = 2.37$ | $n_{d9} = 1.48749$ | $\nu_{d9} = 70.23$ |
| $r_{18} = -6.463$ | $d_{18} = 0.80$ | $n_{d10} = 1.80518$ | $\nu_{d10} = 25.42$ |
| $r_{19} = -8.662$ | $d_{19} = $ (Variable) | | |
| $r_{20} = -66.837$ | $d_{20} = 0.80$ | $n_{d11} = 1.80100$ | $\nu_{d11} = 34.97$ |
| $r_{21} = 5.161$ | $d_{21} = 1.43$ | $n_{d12} = 1.49700$ | $\nu_{d12} = 81.54$ |
| $r_{22} = 13.360$ | $d_{22} = $ (Variable) | | |
| $r_{23} = \infty$ | $d_{23} = 1.53$ | $n_{d13} = 1.68893$ | $\nu_{d13} = 31.07$ |
| $r_{24} = \infty$ | $d_{24} = 1.00$ | | |
| $r_{25} = \infty$ | $d_{25} = 0.69$ | $n_{d14} = 1.51633$ | $\nu_{d14} = 64.14$ |
| $r_{26} = \infty$ | $d_{26} = 0.92$ | | |
| $r_{27} = \infty$ (Image plane) | | | |

Aspherical Coefficients

2nd surface

K = 0.931
$A_4 = 5.91710 \times 10^{-5}$
$A_6 = 2.90815 \times 10^{-6}$
$A_8 = -1.08556 \times 10^{-7}$
$A_{10} = 2.24559 \times 10^{-9}$ 17th surface K = −29.246
$A_4 = -5.70286 \times 10^{-4}$
$A_6 = -1.28534 \times 10^{-5}$
$A_8 = 2.15879 \times 10^{-7}$
$A_{10} = 2.23253 \times 10^{-10}$ Zooming Data (∞)

| | WE | ST | TE |
|---|---|---|---|
| f (mm) | 6.300 | 16.000 | 30.000 |
| $F_{NO}$ | 3.45 | 3.50 | 5.12 |
| $d_6$ | 0.80 | 9.79 | 12.48 |
| $d_{11}$ | 12.16 | 3.17 | 0.50 |
| $d_{14}$ | 6.29 | 4.81 | 0.60 |
| $d_{19}$ | 0.80 | 2.28 | 2.29 |
| $d_{22}$ | 7.91 | 7.91 | 12.11 |

EXAMPLE 2

| | | | |
|---|---|---|---|
| $r_1 = 74.286$ | $d_1 = 1.20$ | $n_{d1} = 1.84666$ | $\nu_{d1} = 23.78$ |
| $r_2 = 16.623$ (Aspheric) | $d_2 = 1.80$ | | |
| $r_3 = \infty$ | $d_3 = 10.40$ | $n_{d2} = 1.83400$ | $\nu_{d2} = 37.16$ |
| $r_4 = \infty$ | $d_4 = 0.10$ | | |
| $r_5 = 41.599$ | $d_5 = 2.96$ | $n_{d3} = 1.72916$ | $\nu_{d3} = 54.68$ |
| $r_6 = -16.304$ | $d_6 =$ (Variable) | | |
| $r_7 = -15.059$ | $d_7 = 1.00$ | $n_{d4} = 1.80610$ | $\nu_{d4} = 40.71$ |
| $r_8 = 6.734$ (Aspheric) | $d_8 = 1.03$ | | |
| $r_9 = 18.973$ | $d_9 = 1.09$ | $n_{d5} = 1.49700$ | $\nu_{d5} = 81.54$ |
| $r_{10} = 15.343$ | $d_{10} = 1.63$ | $n_{d6} = 1.84666$ | $\nu_{d6} = 23.78$ |
| $r_{11} = -68.348$ | $d_{11} =$ (Variable) | | |
| $r_{12} = \infty$ (Stop) | $d_{12} = 0.94$ | | |
| $r_{13} = 13.909$ | $d_{13} = 1.07$ | $n_{d7} = 1.84666$ | $\nu_{d7} = 23.78$ |
| $r_{14} = 17.903$ | $d_{14} =$ (Variable) | | |
| $r_{15} = 7.640$ (Aspheric) | $d_{15} = 3.15$ | $n_{d8} = 1.48749$ | $\nu_{d8} = 70.23$ |
| $r_{16} = -13.821$ (Aspheric) | $d_{16} = 1.30$ | | |
| $r_{17} = 17.122$ | $d_{17} = 1.72$ | $n_{d9} = 1.72916$ | $\nu_{d9} = 54.68$ |
| $r_{18} = -108.235$ | $d_{18} = 1.83$ | $n_{d10} = 1.80518$ | $\nu_{d10} = 25.43$ |
| $r_{19} = 5.564$ | $d_{19} =$ (Variable) | | |
| $r_{20} = 11.442$ | $d_{20} = 0.81$ | $n_{d11} = 1.62004$ | $\nu_{d11} = 36.26$ |
| $r_{21} = 7.159$ | $d_{21} = 0.56$ | | |
| $r_{22} = 12.564$ | $d_{22} = 2.81$ | $n_{d12} = 1.49700$ | $\nu_{d12} = 81.54$ |
| $r_{23} = -10.291$ | $d_{23} =$ (Variable) | | |
| $r_{24} = \infty$ | $d_{24} = 0.76$ | $n_{d13} = 1.54771$ | $\nu_{d13} = 62.84$ |
| $r_{25} = \infty$ | $d_{25} = 0.55$ | | |
| $r_{26} = \infty$ | $d_{26} = 0.50$ | $n_{d14} = 1.51633$ | $\nu_{d14} = 64.14$ |
| $r_{27} = \infty$ | $r_{27} = 1.00$ | | |
| $r_{28} = \infty$ (Image plane) | | | |

Aspherical Coefficients

2nd surface $K = 2.400$
$A_4 = 4.59578 \times 10^{-5}$
$A_6 = -9.81088 \times 10^{-8}$
$A_8 = 1.00772 \times 10^{-8}$
$A_{10} = -2.64529 \times 10^{-10}$ 8th surface $K = -1.216$
$A_4 = -2.92326 \times 10^{-4}$
$A_6 = 1.91909 \times 10^{-6}$
$A_8 = 8.81161 \times 10^{-9}$
$A_{10} = 5.50564 \times 10^{-10}$ 15th surface $K = -1.891$
$A_4 = 1.53592 \times 10^{-4}$
$A_6 = -1.45143 \times 10^{-6}$
$A_8 = -2.59228 \times 10^{-8}$
$A_{10} = -1.57617 \times 10^{-8}$ 16th surface $K = 0.000$
$A_4 = 2.35911 \times 10^{-4}$
$A_6 = -1.82835 \times 10^{-6}$
$A_8 = -1.45114 \times 10^{-7}$
$A_{10} = -1.35956 \times 10^{-8}$ Zooming Data ($\infty$)

| | WE | ST | TE |
|---|---|---|---|
| f (mm) | 6.460 | 13.870 | 31.000 |
| $F_{NO}$ | 3.55 | 4.33 | 5.51 |
| $d_6$ | 1.00 | 8.11 | 13.94 |
| $d_{11}$ | 13.94 | 6.83 | 1.00 |
| $d_{14}$ | 7.74 | 3.68 | 1.00 |
| $d_{19}$ | 6.51 | 9.87 | 14.55 |
| $d_{23}$ | 2.10 | 2.80 | 0.80 |

EXAMPLE 3

| | | | |
|---|---|---|---|
| $r_1 = 78.483$ | $d_1 = 1.00$ | $n_{d1} = 1.84666$ | $\nu_{d1} = 23.78$ |
| $r_2 = 18.069$ (Aspheric) | $d_2 = 1.80$ | | |
| $r_3 = \infty$ | $d_3 = 9.00$ | $n_{d2} = 1.83400$ | $\nu_{d2} = 37.16$ |
| $r_4 = \infty$ | $d_4 = 0.10$ | | |
| $r_5 = 31.063$ | $d_5 = 2.80$ | $n_{d3} = 1.72916$ | $\nu_{d3} = 54.68$ |
| $r_6 = -17.895$ | $d_6 =$ (Variable) | | |
| $r_7 = -18.058$ | $d_7 = 0.80$ | $n_{d4} = 1.80610$ | $\nu_{d4} = 40.92$ |
| $r_8 = 5.817$ (Aspheric) | $d_8 = 0.81$ | | |
| $r_9 = 11.223$ | $d_9 = 0.97$ | $n_{d5} = 1.49700$ | $\nu_{d5} = 81.54$ |
| $r_{10} = 7.232$ | $d_{10} = 1.60$ | $n_{d6} = 1.84666$ | $\nu_{d6} = 23.78$ |
| $r_{11} = 14.472$ | $d_{11} =$ (Variable) | | |
| $r_{12} = \infty$ (Stop) | $d_{12} = 0.50$ | | |
| $r_{13} = 14.817$ | $d_{13} = 1.29$ | $n_{d7} = 1.84666$ | $\nu_{d7} = 23.78$ |
| $r_{14} = 30.226$ | $d_{14} =$ (Variable) | | |
| $r_{15} = 9.698$ (Aspheric) | $d_{15} = 2.16$ | $n_{d8} = 1.58313$ | $\nu_{d8} = 59.46$ |
| $r_{16} = -23.279$ (Aspheric) | $d_{16} = 0.81$ | | |
| $r_{17} = 20.426$ | $d_{17} = 1.87$ | $n_{d9} = 1.49700$ | $\nu_{d9} = 81.54$ |
| $r_{18} = -14.642$ | $d_{18} = 1.00$ | $n_{d10} = 1.80518$ | $\nu_{d10} = 25.42$ |
| $r_{19} = 21.707$ | $d_{19} =$ (Variable) | | |
| $r_{20} = 12.713$ | $d_{20} = 2.37$ | $n_{d11} = 1.49700$ | $\nu_{d11} = 81.54$ |
| $r_{21} = -11.490$ | $d_{21} = 0.50$ | | |
| $r_{22} = -7.663$ | $d_{22} = 0.95$ | $n_{d12} = 1.80400$ | $\nu_{d12} = 46.57$ |
| $r_{23} = -20.161$ | $d_{23} =$ (Variable) | | |
| $r_{24} = \infty$ | $d_{24} = 0.76$ | $n_{d13} = 1.54771$ | $\nu_{d13} = 62.84$ |
| $r_{25} = \infty$ | $d_{25} = 0.55$ | | |
| $r_{26} = \infty$ | $d_{26} = 0.50$ | $n_{d14} = 1.51633$ | $\nu_{d14} = 64.14$ |
| $r_{27} = \infty$ | $r_{27} = 1.00$ | | |
| $r_{28} = \infty$ (Image plane) | | | |

Aspherical Coefficients

2nd surface $K = 2.936$
$A_4 = 3.24925 \times 10^{-5}$
$A_6 = 4.62074 \times 10^{-9}$
$A_8 = 1.55496 \times 10^{-9}$
$A_{10} = -7.19302 \times 10^{-11}$ 8th surface $K = -0.670$
$A_4 = -2.37774 \times 10^{-4}$
$A_6 = 7.13029 \times 10^{-7}$
$A_8 = -2.82712 \times 10^{-7}$
$A_{10} = 1.56507 \times 10^{-8}$ 15th surface $K = -0.413$
$A_4 = -4.12802 \times 10^{-5}$
$A_6 = -2.89356 \times 10^{-7}$
$A_8 = -2.10358 \times 10^{-7}$
$A_{10} = 0$ 16th surface $K = 0.000$
$A_4 = 1.11835 \times 10^{-4}$
$A_6 = -1.08237 \times 10^{-6}$
$A_8 = -3.07602 \times 10^{-7}$
$A_{10} = 3.63304 \times 10^{-9}$ Zooming Data ($\infty$)

| | WE | ST | TE |
|---|---|---|---|
| f (mm) | 6.460 | 13.870 | 31.000 |
| $F_{NO}$ | 3.57 | 4.36 | 4.42 |
| $d_6$ | 1.00 | 8.55 | 16.21 |
| $d_{11}$ | 6.69 | 3.81 | 1.00 |
| $d_{14}$ | 10.54 | 4.01 | 1.00 |
| $d_{19}$ | 9.83 | 6.66 | 7.54 |
| $d_{23}$ | 1.80 | 6.83 | 4.11 |

EXAMPLE 4

| | | | |
|---|---|---|---|
| $r_1 = 74.395$ | $d_1 = 1.00$ | $n_{d1} = 1.84666$ | $\nu_{d1} = 23.78$ |
| $r_2 = 17.823$ (Aspheric) | $d_2 = 1.80$ | | |
| $r_3 = \infty$ | $d_3 = 9.87$ | $n_{d2} = 1.83400$ | $\nu_{d2} = 37.16$ |
| $r_4 = \infty$ | $d_4 = 0.10$ | | |
| $r_5 = 35.551$ | $d_5 = 2.74$ | $n_{d3} = 1.72916$ | $\nu_{d3} = 54.68$ |
| $r_6 = -17.149$ | $d_6 =$ (Variable) | | |
| $r_7 = -21.180$ | $d_7 = 0.80$ | $n_{d4} = 1.80610$ | $\nu_{d4} = 40.92$ |
| $r_8 = 5.516$ (Aspheric) | $d_8 = 0.72$ | | |
| $r_9 = 8.846$ | $d_9 = 1.05$ | $n_{d5} = 1.49700$ | $\nu_{d5} = 81.54$ |
| $r_{10} = 6.611$ | $d_{10} = 1.56$ | $n_{d6} = 1.84666$ | $\nu_{d6} = 23.78$ |
| $r_{11} = 10.991$ | $d_{11} =$ (Variable) | | |
| $r_{12} = \infty$ (Stop) | $d_{12} = 0.50$ | | |
| $r_{13} = 12.024$ | $d_{13} = 1.31$ | $n_{d7} = 1.84666$ | $\nu_{d7} = 23.78$ |
| $r_{14} = 23.772$ | $d_{14} =$ (Variable) | | |
| $r_{15} = 9.006$ (Aspheric) | $d_{15} = 2.03$ | $n_{d8} = 1.58313$ | $\nu_{d8} = 59.46$ |
| $r_{16} = -48.129$ (Aspheric) | $d_{16} = 0.49$ | | |
| $r_{17} = 19.488$ | $d_{17} = 1.98$ | $n_{d9} = 1.49700$ | $\nu_{d9} = 81.54$ |
| $r_{18} = -12.052$ | $d_{18} = 1.00$ | $n_{d10} = 1.80518$ | $\nu_{d10} = 25.42$ |
| $r_{19} = 35.997$ | $d_{19} =$ (Variable) | | |
| $r_{20} = 12.563$ | $d_{20} = 2.35$ | $n_{d11} = 1.49700$ | $\nu_{d11} = 81.54$ |
| $r_{21} = -10.563$ | $d_{21} = 0.55$ | | |
| $r_{22} = -6.788$ | $d_{22} = 0.89$ | $n_{d12} = 1.80400$ | $\nu_{d12} = 46.57$ |
| $r_{23} = -19.068$ | $d_{23} =$ (Variable) | | |
| $r_{24} = \infty$ | $d_{24} = 0.76$ | $n_{d13} = 1.54771$ | $\nu_{d13} = 62.84$ |
| $r_{25} = \infty$ | $d_{25} = 0.55$ | | |
| $r_{26} = \infty$ | $d_{26} = 0.50$ | $n_{d14} = 1.51633$ | $\nu_{d14} = 64.14$ |
| $r_{27} = \infty$ | $r_{27} = 1.00$ | | |
| $r_{28} = \infty$(Image plane) | | | |

Aspherical Coefficients

2nd surface $K = 3.015$
$A_4 = 3.50177 \times 10^{-5}$
$A_6 = 7.94243 \times 10^{-9}$
$A_8 = 2.91877 \times 10^{-9}$
$A_{10} = -1.20085 \times 10^{-10}$ 8th surface $K = -0.606$
$A_4 = -1.87418 \times 10^{-4}$
$A_6 = 4.40367 \times 10^{-7}$
$A_8 = -8.67768 \times 10^{-7}$
$A_{10} = 8.72107 \times 10^{-8}$ 15th surface $K = -0.244$
$A_4 = -9.38372 \times 10^{-6}$
$A_6 = 3.69153 \times 10^{-8}$
$A_8 = -2.88283 \times 10^{-7}$
$A_{10} = 0$ 16th surface $K = 0.000$
$A_4 = 1.36917 \times 10^{-4}$
$A_6 = -9.90255 \times 10^{-7}$
$A_8 = -4.95194 \times 10^{-7}$
$A_{10} = 7.90654 \times 10^{-9}$

Zooming Data ($\infty$)

| | WE | ST | TE |
|---|---|---|---|
| f (mm) | 6.460 | 14.072 | 31.000 |
| $F_{NO}$ | 3.58 | 4.39 | 4.19 |
| $d_6$ | 1.00 | 8.92 | 17.05 |
| $d_{11}$ | 6.40 | 3.70 | 1.00 |
| $d_{14}$ | 10.66 | 3.82 | 1.00 |
| $d_{19}$ | 9.61 | 5.67 | 6.30 |
| $d_{23}$ | 1.80 | 7.37 | 4.11 |

Figure 5A:
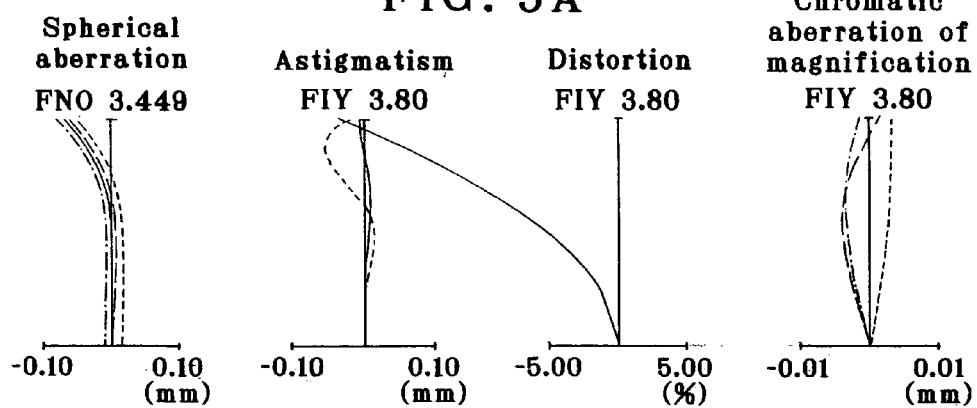
FIGS. 5(A), 5(B) and 5(C) are aberration diagrams indicative of spherical aberration, astigmatism, distortion and chromatic aberration of magnification at the wide-angle end, in an intermediate setting and at the telephoto end of Example 1, respectively, upon focusing on an object point at infinity.
Figure 5B:
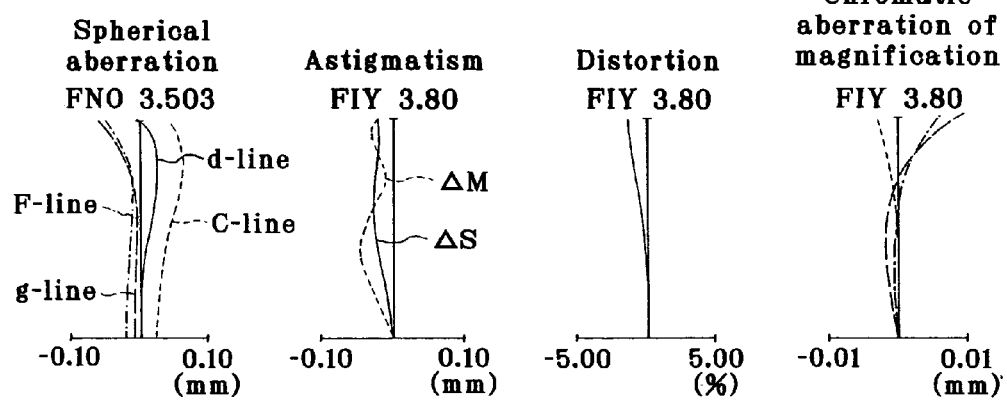
Figure 5C:
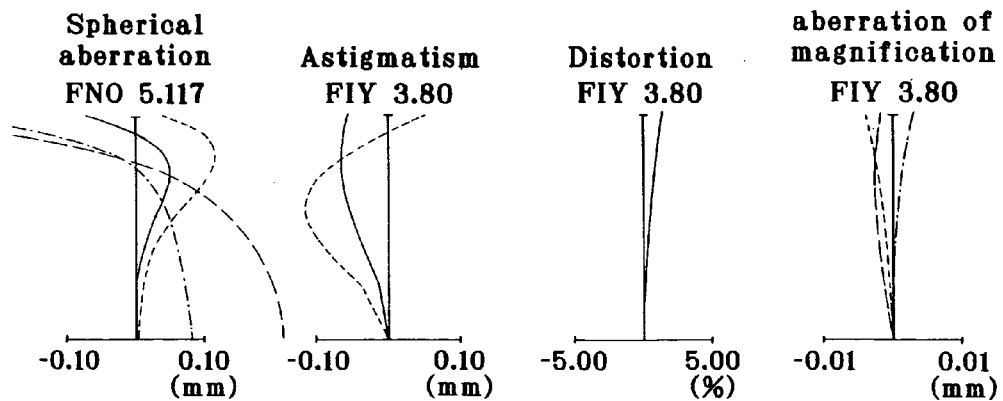
Figure 6A:
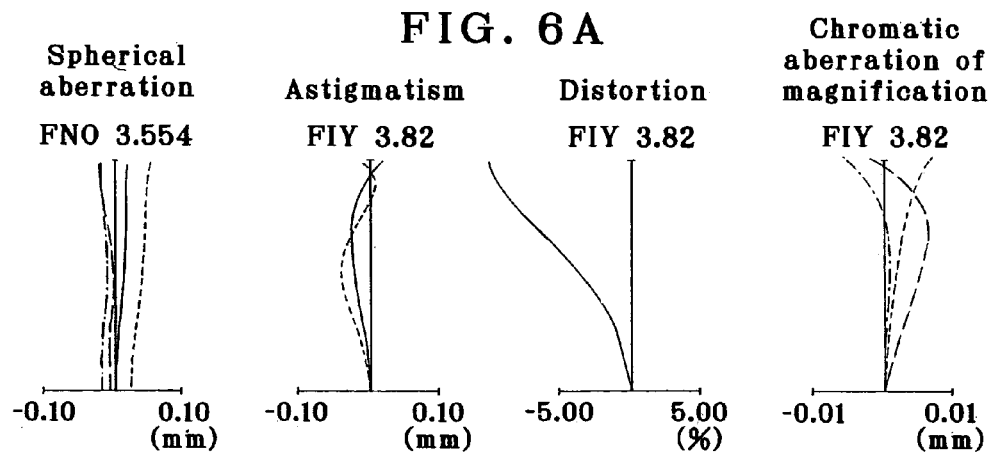
FIGS. 6(A), 6(B) and 6(C) are aberration diagrams, as in FIGS. 5(A), 5(B) and 5(C), but of Example 2.
Figure 6B:
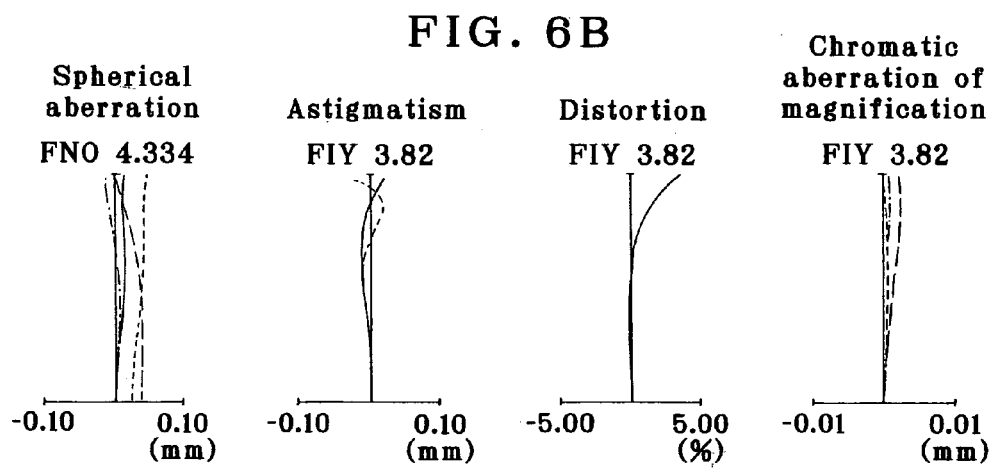
Figure 6C:
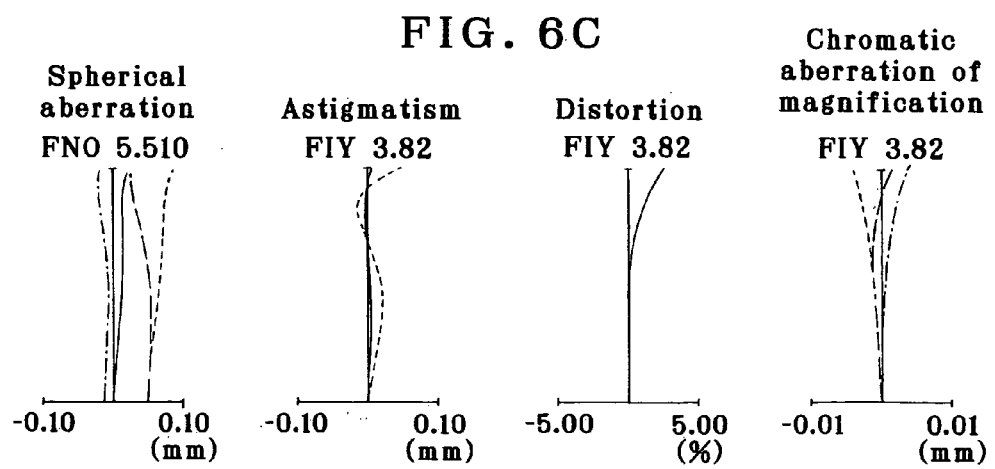
Figure 8A:
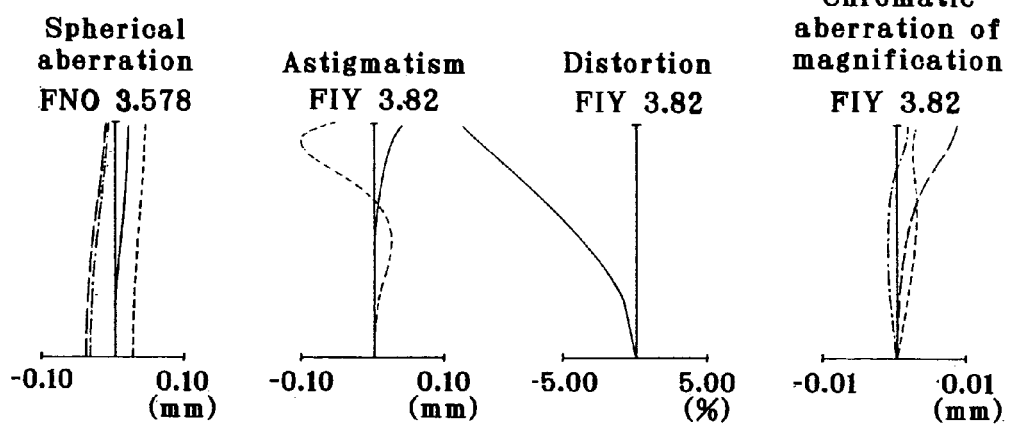
FIGS. 8(A), 8(B) and 8(C) are aberration diagrams, as in FIGS. 5(A), 5(B) and 5(C), but of Example 4.
Figure 8B:
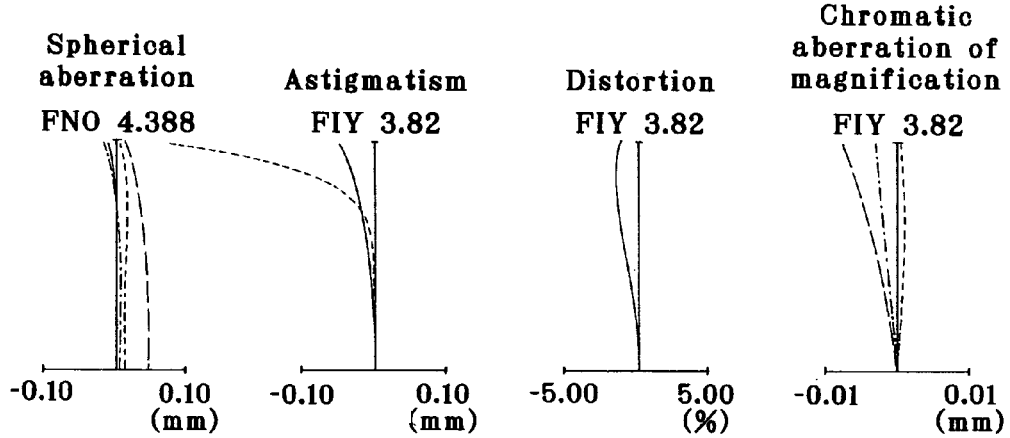
Figure 8C:
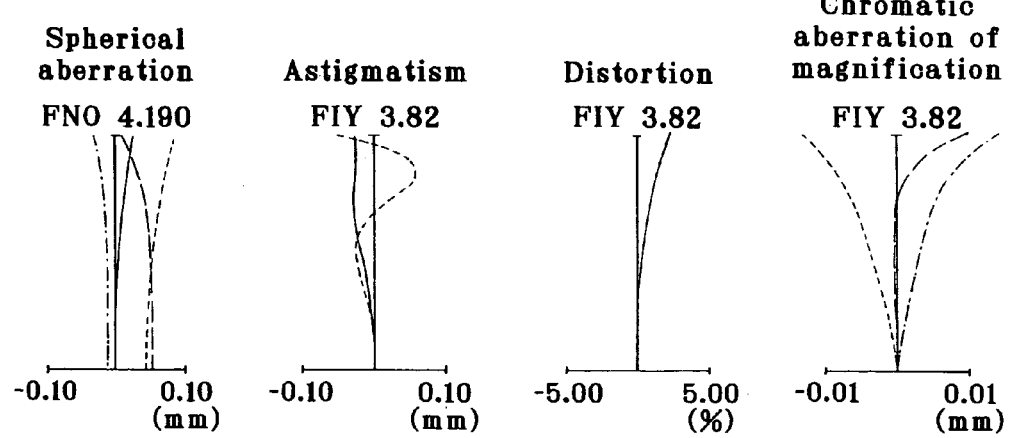

FIGS. 5A, 5B and 5C are aberration diagrams illustrative of spherical aberration, astigmatism, distortion and chromatic aberration of magnification at the wide-angle end, in an intermediate setting and at the telephoto end, respectively, of Example 1 upon focusing on an infinite object point. Similar aberrations for Examples 2, 3 and 4 are shown in FIGS. 6A, 6B and 6C, FIGS. 7A, 7B and 7C, and FIGS. 8A, 8B and 8C, respectively. In each aberration diagram, "FIY" is indicative of a maximum image height.

The values of conditions (1) to (9) in each of Examples 1 to 4 are given below.

| Condition | Ex. 1 | Ex. 2 | Ex. 3 | Ex. 4 |
|---|---|---|---|---|
| (1) | 1.19 | 1.59 | 1.03 | 1.00 |
| (2) | 1.41 | 2.83 | 2.43 | 2.44 |
| (3) | 1.19 | 1.80 | 1.97 | 1.97 |
| (4) | 1.00 | 1.16 | 1.13 | 1.15 |
| (5) | 0.91 | 0.94 | 0.93 | 0.94 |
| (6) | 3.25 | 3.66 | 3.51 | 3.52 |
| (7) | 1.43 | 2.76 | 7.18 | 9.62 |
| (8) | 0.30 | 0.58 | 1.50 | 2.00 |
| (9) | 4.76 | 4.80 | 4.80 | 4.80 |

The zoom lens of the invention may have applications to an electronic imaging system in which an object image formed by a zoom lens is received at a CCD or other electronic image pickup device for taking purposes, especially a digital camera, a video camera or the like, as embodied below.

Figure 9:
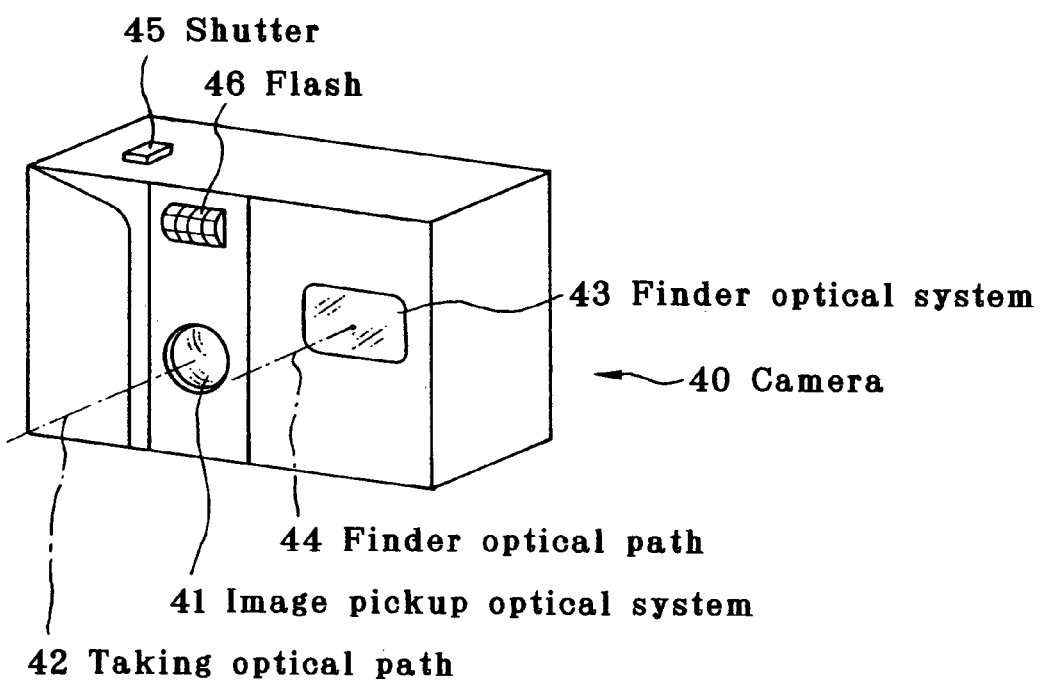
FIG. 9 is a front perspective schematic illustrative of the appearance of a digital camera with the inventive optical path-bent zoom lens built therein.
Figure 10:
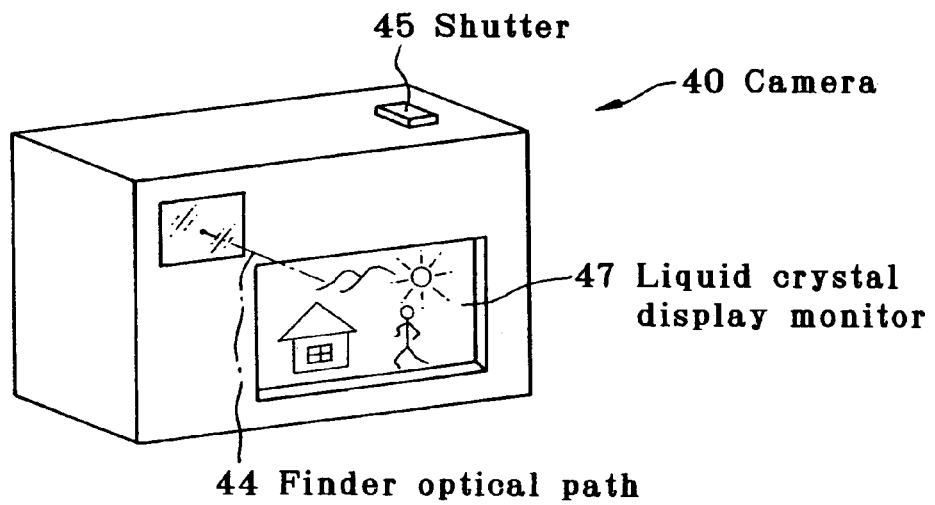
FIG. 10 is a rear perspective schematic of the digital camera of FIG. 9.
Figure 11:
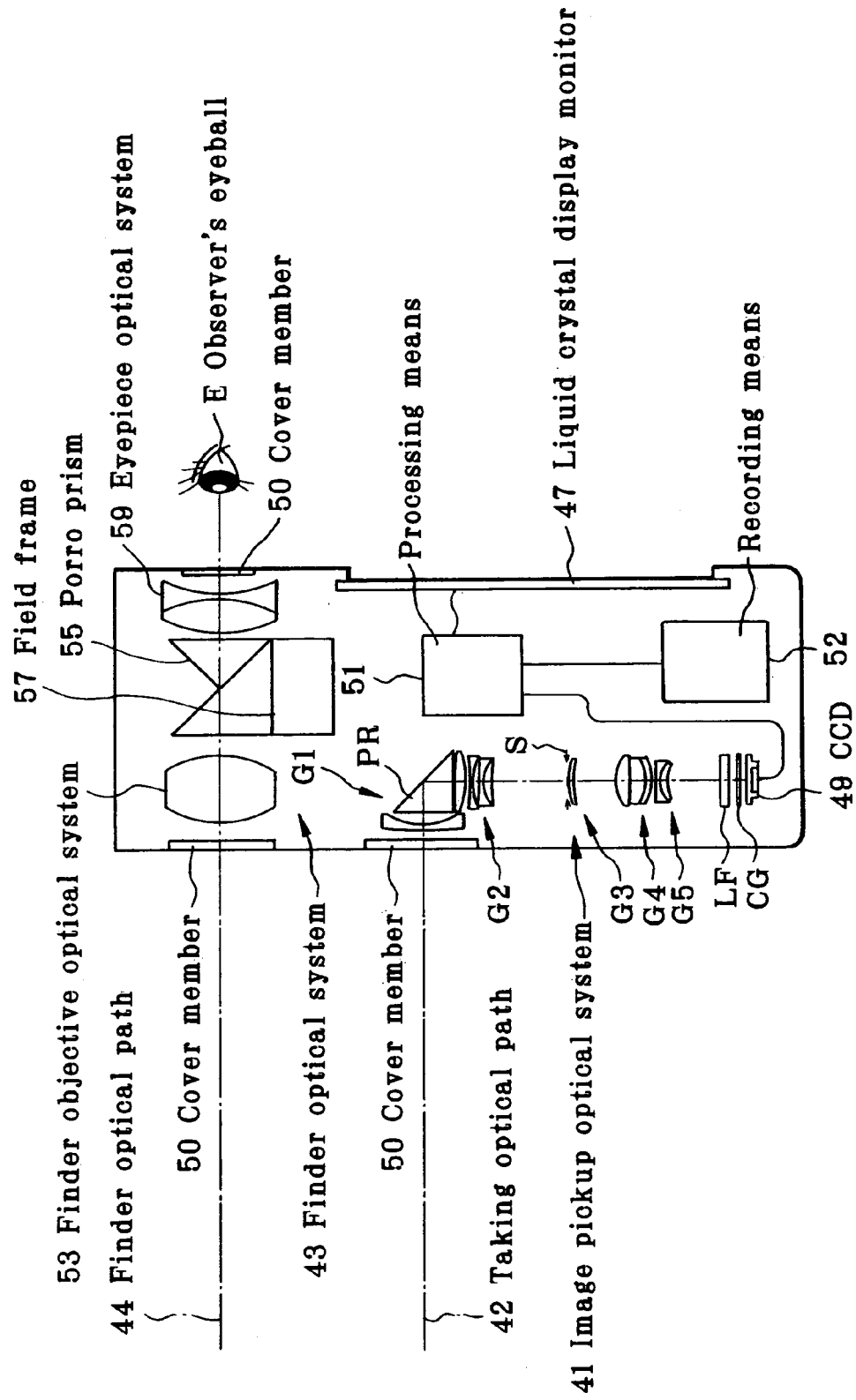
FIG. 11 is a sectional schematic of the digital camera of FIG. 9.

FIGS. 9, 10 and 11 are conceptual illustrations of a taking optical system 41 for digital cameras, in which the zoom les of the invention is incorporated. FIG. 9 is a front perspective view of the appearance of a digital camera 40, and FIG. 10 is a rear perspective view of the same. FIG. 11 is a sectional view of the construction of the digital camera 40. In this embodiment, the digital camera 40 comprises a taking optical system 41 including a taking optical path 42, a finder optical system 43 including a finder optical path 44, a shutter 45, a flash 46, a liquid crystal monitor 47 and so on. As the shutter 45 mounted on the upper portion of the camera 40 is pressed down, it causes an image to be taken through the taking optical system 41, for instance, the optical path-bending zoom lens of Example 1. An object image formed by the taking optical system 41 is formed on the image pickup plane of a CCD 49 via a near infrared cut filter and an optical low-pass filter LF. An object image received at CCD 49 is shown as an electronic image on the liquid crystal monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the taking optical system 41 and finder objective optical system 53 as well as on the exit side of the eyepiece optical system 59.

With the thus constructed digital camera 40, it is possible to achieve high performance and much more thickness reductions in its depth direction, because the taking optical system 41 is a zoom lens having a zoom ratio of as high as about 5 and an improved optical performance.

In the embodiment of FIG. 11, plane-parallel plates are used as the cover members 50; however, it is acceptable to leave them out or use powered lenses.

We claim:

1. A zoom lens, including, in order from an object side thereof, a first lens group having positive power, a second lens group having negative power, a third lens group having positive power and a fourth lens group having positive power, and comprising five lens groups in all, wherein:

said first lens group comprises, in order from an object side thereof, a negative lens component, an optical path-bending optical member and a positive lens component, wherein, upon zooming from a wide-angle end to a telephoto end of said zoom lens, said first lens group remains substantially fixed with respect to an image plane, said second lens group moves only toward an image side of said zoom lens, and said fourth lens group moves in such a way as to be positioned nearer to the object side at the telephoto end than at the wide-angle end, and which satisfies the following condition (1):

$$0.8 < |f_2/f_w| < 4.0 \quad (1)$$

where $f_2$ is a focal length of the second lens group, and $f_w$ is a focal length of the zoom lens at the wide-angle end.

2. The zoom lens according to claim 1, which satisfies the following condition (2):

$$0.8 < f_4/f_w < 4.0 \quad (2)$$

where $f_4$ is a focal length of the fourth lens group, and $f_w$ is a focal length of the zoom lens at the wide-angle end.

3. The zoom lens according to claim 1, which satisfies the following conditions (3) and (4):

$$0.8 < |f_{1n}|/\sqrt{(f_w \times f_t)} < 3.0 \quad (3)$$

$$0.8 < f_{1p}/\sqrt{(f_w \times f_t)} < 3.0 \quad (4)$$

where $f_{1n}$ is a focal length of the negative lens component in the first lens group, $f_{1p}$ is a focal length of the positive lens component in the first lens group, $f_w$ is a focal length of the zoom lens at the wide-angle end, and $f_t$ is a focal length of the zoom lens at the telephoto end.

4. The zoom lens according to claim 1, wherein the negative lens component and the positive lens component in said first lens group are each composed of a single lens.

5. The zoom lens according to claim 1, wherein an image-side surface of the negative lens component located in said first lens group and nearest to an object side thereof is a concave surface having an aspheric surface.

6. The zoom lens according to claim 1, wherein said third lens group consists of a single lens in a meniscus form convex on an object side thereof.

7. The zoom lens according to claim 1, wherein said fourth lens group consist of, in order from an object side thereof, a positive lens component, a positive lens component and a negative lens component.

8. The zoom lens according to claim 1, which satisfies the following conditions (7) and (8):

$$0.6 < |f_5/f_w| < 20 \quad (7)$$

$$0.1 < < |f_5/f_t| < 5.0 \quad (8)$$

where $f_5$ is a focal length of the fifth lens group, $f_w$ is a focal length of the zoom lens at the wide-angle end, and $f_t$ is a focal length of the zoom lens at the telephoto end.

9. The zoom lens according to claim 1, which 25 satisfies the following condition (9):

$$3.5 < f_t/f_w < 10 \quad (9)$$

where $f_w$ is a focal length of the zoom lens at the wide-angle end, and $f_t$ is a focal length of the zoom lens at the telephoto end.

10. An electronic imaging system, comprising a zoom lens as recited in claim 1 and an electronic image pickup device for producing an image formed through said zoom lens as image data, wherein a shape of the image data is capable of being changed by processing the image data, and said zoom lens satisfies the following condition (5) upon focusing on a substantially infinite object point:

$$0.75 < y_{07}/(f_w \cdot \tan \omega_{07w}) < 0.97 \quad (5)$$

where $y_{10}$ is a distance from a center to the farthest point in an effective image pickup plane of the electronic image device, $y_{07}$ is represented as $y_{07} = 0.7 y_{10}$, and $\omega_{07w}$ is an angle with an optical axis in a direction of an object point corresponding to an image point formed at a position of $y_{07}$ from the center on the effective image pickup plane of the electronic image pickup device at the wide-angle end.

* * * * *

UNITED STATES PATENT AND TRADEMARK OFFICE
CERTIFICATE OF CORRECTION

| | |
|---|---|
| PATENT NO. | : 7,154,680 B2 |
| APPLICATION NO. | : 11/235170 |
| DATED | : December 26, 2006 |
| INVENTOR(S) | : Tomoyuki Satori et al. |

Page 1 of 1

It is certified that error appears in the above-identified patent and that said Letters Patent is hereby corrected as shown below:

Column 18, line 19, change "$0.1<<|f_5/f_t|<5.0$" to --$0.1<|f_5/f_t|<5.0$--;

Signed and Sealed this

Seventh Day of August, 2007

JON W. DUDAS
*Director of the United States Patent and Trademark Office*